United States Patent
Roh et al.

(10) Patent No.: US 9,279,937 B2
(45) Date of Patent: Mar. 8, 2016

(54) OPTICAL INTERCONNECTION FOR STACKED INTEGRATED CIRCUIT

(71) Applicant: SAMSUNG ELECTRONICS CO., LTD., Suwon-si (KR)

(72) Inventors: Young-geun Roh, Seoul (KR); Chang-won Lee, Hwaseong-si (KR); Un-jeong Kim, Hwaseong-si (KR); Jin-eun Kim, Suwon-si (KR); Yeon-sang Park, Seoul (KR); Jae-soong Lee, Suwon-si (KR); Sang-mo Cheon, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/248,759

(22) Filed: Apr. 9, 2014

(65) Prior Publication Data
US 2014/0376856 A1 Dec. 25, 2014

(30) Foreign Application Priority Data
Jun. 21, 2013 (KR) .................. 10-2013-0071943

(51) Int. Cl.
*G02B 26/08* (2006.01)
*G02B 6/122* (2006.01)

(52) U.S. Cl.
CPC .................. *G02B 6/1226* (2013.01)

(58) Field of Classification Search
USPC ............................................. 385/14
See application file for complete search history.

(56) References Cited

U.S. PATENT DOCUMENTS

| 7,555,217 B2 | 6/2009 | Hillis et al. |
| 7,768,689 B2 | 8/2010 | Furuyama |
| 2009/0274467 A1 | 11/2009 | Morris et al. |
| 2012/0068891 A1 | 3/2012 | Haroun et al. |

*Primary Examiner* — Eric Wong
(74) *Attorney, Agent, or Firm* — Sughrue Mion, PLLC

(57) ABSTRACT

An optical interconnection for a stacked integrated circuit, is provided. The optical interconnection includes: an optical transmission unit disposed in a first layer and an optical receiving unit disposed in a second layer, different from the first layer, and spaced apart from the optical transmission unit by a predetermined gap. The optical transmission unit includes a first optical antenna that outputs light; the optical receiving unit includes a second optical antenna which receives light transmitted from the optical transmission unit. At least one of the first and second optical antennas includes a plurality of nanostructures configured to transmit or receive an optical signal.

18 Claims, 5 Drawing Sheets

OPTICAL INTERCONNECTION FOR STACKED INTEGRATED CIRCUIT

CROSS-REFERENCE TO RELATED APPLICATION

This application claims priority from Korean Patent Application No. 10-2013-0071943, filed on Jun. 21, 2013, in the Korean Intellectual Property Office, the disclosure of which is incorporated herein in its entirety by reference.

BACKGROUND

1. Field

Apparatuses consistent with exemplary embodiments relate to optical interconnection, and more particularly, to optical interconnection for stacked integrated circuits, whereby integrated circuits can be simplified and three-dimensional integration caused thereby can be easily performed.

2. Description of the Related Art

Semiconductor devices have been drastically improved in terms of processing speed, large-capacity data transmission and integration capacity. As the miniaturization of semiconductor devices reaches its limit, a three-dimensional stacked structure has been adopted so as to improve a degree of integration of chips. One problem that may occur when the three-dimensional stacked structure is adopted, is the difficulty in establishing a communication path between vertically-stacked layers. A path in an in plane direction may be easily formed through a top-down process using general lithography; however, it is not easy to form a path in a vertical direction.

For example, in the case of electronic devices, via holes that penetrate layers are formed and filled with metals, thereby obtaining a communication path. However, it is difficult to perform a process of obtaining the communication path by forming via holes, costs increase, and the flow of the entire process becomes complicated.

SUMMARY

One or more exemplary embodiments may provide optical interconnection for stacked integrated circuits, whereby integrated circuits can be simplified and three-dimensional integration caused thereby can be easily performed by solving a communication problem between layers in a vertical stack structure by adopting an optical antenna structure that operates at an optical frequency and by transmitting and receiving high-directivity beams.

Additional exemplary aspects and advantages will be set forth in part in the description which follows and, in part, will be apparent from the description, or may be learned by practice of the presented embodiments.

According to an aspect of an exemplary embodiment, an optical interconnection for a stacked integrated circuit includes an optical transmission unit disposed in a first layer, the optical transmission unit comprising a first optical antenna that outputs light; and an optical receiving unit disposed in a second layer, different from the first layer, and spaced apart from the optical transmission unit by a predetermined gap, the optical receiving unit including a second optical antenna which receives light transmitted from the optical transmission unit. At least one of the first optical antenna and the second optical antenna includes a plurality of nanostructures configured to transmit or receive an optical signal.

The optical interconnection may be between layers of different stacked electronic device chips, between layers of different stacked photonic device chips; between layers of different semiconductor packages; between a layer of an electronic device chip and a layer of a photonic device chip; or between a layer of a semiconductor package and a layer of a photonic device chip or a layer of an electronic device chip.

The first optical antennal may include a first plurality of nanostructures formed in a first material layer and the second optical antenna may include a second plurality of nanostructures formed in a second material layer.

The first and second pluralities of nanostructures may be recesses formed in the first and second material layers, respectively.

One or both of the first and second material layers may be a metal layer.

One or both of the first and second material layers may be a plasmonic waveguide which propagates an optical signal in the form of surface plasmon.

The first and second pluralities of nanostructures may be formed in a plasmonic waveguide and may be recesses formed in a metal layer of the plasmonic waveguide.

The plasmonic waveguide may include a first metal layer, a dielectric layer, and a second metal layer, such that the plasmonic waveguide comprises a metal layer-dielectric layer-metal layer structure.

The optical transmission unit may include a laser light source and the optical receiving unit may include an optical detector.

The plurality of nanostructures may include a first nanostructure having a slot shape, which feeds light to at least one second nanostructure, and the at least one second nanostructure which directs light incident thereon. The plurality of nanostructures may also include at least one third nanostructure which reflects light incident thereon. The at least one second nanostructure may be angled with respect to the first nanostructure, and the at least one third nanostructure may be parallel to the at least one second nanostructure.

Each of the plurality of nanostructures may have a dimension smaller than a wavelength of the transmitted and received light.

The first optical antenna may include a first plurality of nanostructures and the second optical antenna may include a second plurality of nanostructures that are upside down with respect to the first plurality of nanostructures.

The optical transmission unit may be disposed in a first chip, and the optical receiving unit may be disposed in a second chip, such that the transmission of an optical signal between the optical transmission unit and the optical receiving unit is a chip-to-chip communication

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
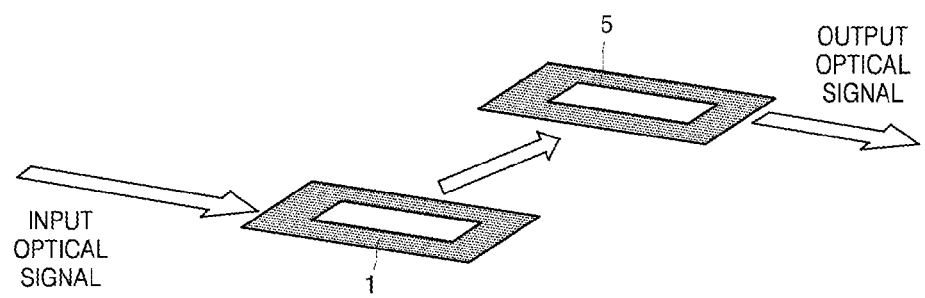
FIG. 1 schematically illustrates the principle of optical interconnection for a stacked integrated circuit according to an exemplary embodiment.

Reference will now be made in detail to embodiments, examples of which are illustrated in the accompanying drawings, wherein like reference numerals refer to the like elements throughout. In this regard, the exemplary embodiments may have different forms and should not be construed as being limited to the descriptions set forth herein. Accordingly, the embodiments are merely described below, by referring to the figures, to explain aspects of the present description. Like reference numerals in the drawings refer to like elements, and the sizes or thicknesses of elements may be exaggerated for convenience of explanation. As used herein, the term "and/or" includes any and all combinations of one or more of the associated listed items. Expressions such as "at least one of," when preceding a list of elements, modify the entire list of elements and do not modify the individual elements of the list.

FIG. 1 schematically illustrates the principle of optical interconnection for a stacked integrated circuit according to an exemplary embodiment.

Referring to FIG. 1, in a vertical stacked structure for a stacked integrated circuit, inter-layer optical signal transmission may be performed in such a way that an input optical signal generated in a predetermined layer, e.g., a lower layer, is transmitted using a first optical antenna 1, is received by second optical antenna 5 disposed in a layer vertically formed in a different position from a position of the predetermined layer and the optical signal is output by the second optical antenna 5. Optical interconnection may establish an optical communication path, i.e., an optical via without an additional structure.

In a three-dimensional stacked structure, a via hole that penetrates layers is formed, and is filled with metal, thereby forming a communication path, i.e., a movement path of electrons.

On the other hand, when optical interconnection is used in a stacked integrated circuit according to an exemplary embodiment, communication (i.e., signal transmission) between two optical antennas 1 and 5 may be performed without the need of obtaining an additional communication path for signal transmission between layers. This is because the wavelength of light used in the optical interconnection for communication is a relatively long wavelength, e.g., an infrared wavelength, and most semiconductor materials, except for metals or dielectric materials, transmit light having the relatively long wavelength.

When optical interconnection is used, signals between layers may be transmitted in the form of electromagnetic radiation using light, unlike in the stacked integrated circuit in which a conductor line path is essential for the movement of electrons. Light may transmit information more rapidly, and there is no interference between signals due to an overlapping principle.

The optical antennas 1 and 5 used for inter-layer optical transmission may form a structure in which light proceeds only in a particular direction. A transmission direction may be adjusted by the configuration, the size, the interval, and material layers of a structure.

Figure 2:
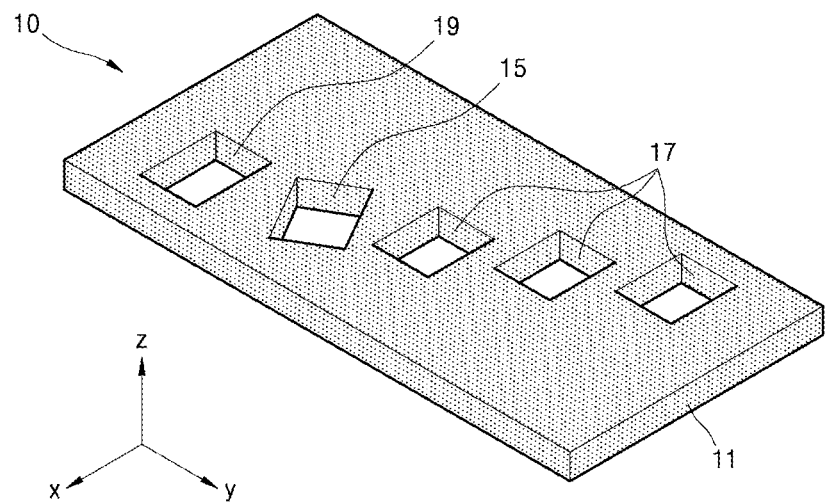
FIG. 2 schematically illustrates an example of an optical antenna that may be adopted for optical interconnection for the stacked integrated circuit according to an exemplary embodiment.

An optical antenna used for optical interconnection for the stacked integrated circuit according to an exemplary embodiment may include a plurality of nanostructures, as illustrated in FIG. 2, for example. Since the direction of light can be controlled by including a component perpendicular to a surface of the optical antenna, an optical signal may be transmitted to other layers in a vertical direction.

FIG. 2 schematically illustrates an example of an optical antenna 10 that may be used for optical interconnection for the stacked integrated circuit according to an exemplary embodiment.

Referring to FIG. 2, the optical antenna 10 may include a plurality of nanostructures 15, 17, and 19 that are provided in a material layer 11. The material layer 11 may be a metal layer, and surface plasmon with respect to an input optical signal occurs in the optical antenna 10 due to the material layer 11. Also, the plurality of nanostructures 15, 17, and 19 may be formed as intaglio-type structures in the material layer 11. In other words, the plurality of nanostructures 15, 17, and 19 may take the shape of slots or other types of incisions in the material layer. The transmission direction of the input optical signal may be adjusted according to the sizes, shapes, arrangement intervals, and materials of the plurality of nanostructures 15, 17, and 19.

Each of the plurality of nanostructures 15, 17, and 19 may have a smaller dimension than the wavelength of the transmitted and received light. Here, the dimension may mean the length of the nanostructure or an interval between nanostructures.

The plurality of nanostructures 15, 17, and 19 may include a first nanostructure 15 and at least one second nanostructure 17. Also, the plurality of nanostructures 15, 17, and 19 may further include at least one third nanostructure 19. The first nanostructure 15 may operate as a feeding unit in which surface plasmon with respect to the input optical signal occurs. The second nanostructure 17 and the third nanostructure 19 may operate as a director that guides the direction of light and a reflector that reflects light, respectively. For example, the direction of transmission of the light may be controlled by adjusting at least one of the sizes and shapes of the second nanostructure 17 and the third nanostructure 19, an interval between the first nanostructure 15 and the second nanostructure 17, and an interval between the first nanostructure 15 and the third nanostructure 19.

The first nanostructure 15 that operates as the feeding unit may be configured to form a predetermined angle with respect to the second nanostructure 17 that operates as the director. Also, the second nanostructure 17 may be configured to be parallel to the third nanostructure 19 that operates as the reflector.

For example, when a polarization direction of the input optical signal is parallel to the direction of an x-axis, the first nanostructure 15 may be configured in such a way that a long width of the first nanostructure 15 forms an angle of approximately 45° with respect to the polarization direction. Also, the second and/or third nanostructure 17 and/or 19 may be configured in such a way that long widths or a long width of the second and/or third nanostructure 17 and/or 19 is parallel to the polarization direction of the input optical signal. In the nanostructure, when input light has polarization components parallel to the long width of the nanostructure, surface plasmon having components parallel to a short width of the nanostructure may occur.

Figure 3:
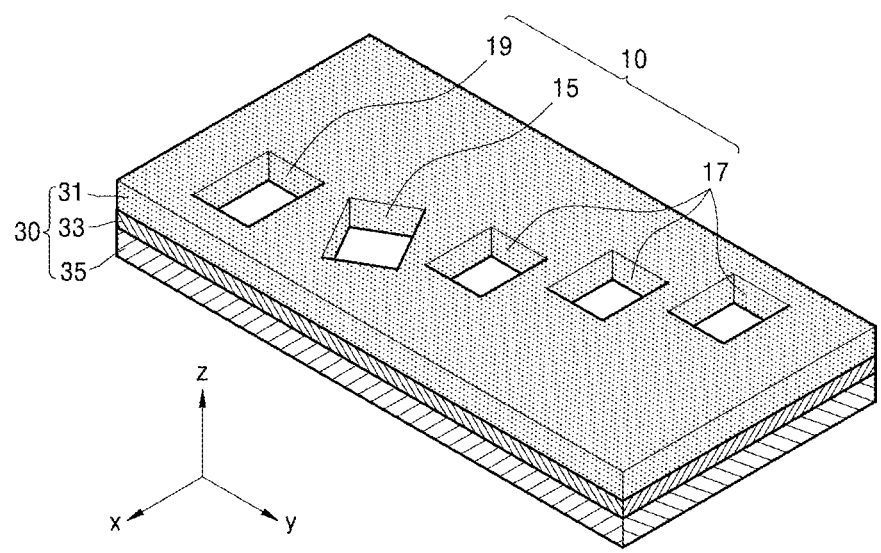
FIG. 3 illustrates a combined structure of an optical antenna and a plasmonic waveguide.

FIG. 3 shows a combined structure of the optical antenna 10 and a plasmonic waveguide 30. The combined structure of FIG. 3 may be used as at least one of an optical transmission unit and an optical receiving unit in the stacked integrated circuit according to an exemplary embodiment. FIG. 3 illustrates an example in which the optical antenna 10 of FIG. 2 is used. This is illustrative, and the plurality of nanostructures 15, 17, and 19 of the optical antenna 10 used in the combined structure may be modified in various forms.

Referring to FIG. 3, the plasmonic waveguide 30 includes a metal layer 31 and is provided to propagate an optical signal in the form of surface plasmon. The plasmonic waveguide 30 may further include a dielectric layer 33 formed to contact the metal layer 31. Also, the plasmonic waveguide 30 may further include a metal layer 35 formed on a surface of the dielectric layer 33 opposite the metal layer 31. The plasmonic waveguide, therefore, may constitute a metal layer 31-dielectric layer 33-metal layer 35 structure.

The plurality of nanostructures 15, 17, and 19 that constitute the optical antenna 10 may be formed on the plasmonic waveguide 30. For example, the plurality of nanostructures 15, 17, and 19 that constitute the optical antenna 10 may be formed in the metal layer 31 of the plasmonic waveguide 30 in an intaglio-type structure.

According to the combined structure of the optical antenna 10 and the plasmonic waveguide 30, a desired optical signal may propagate, in the form of surface plasmon through the plasmonic waveguide 30 of the metal layer 31-dielectric layer 33-metal layer 35, for example. The optical signal may be radiated by the optical antenna 10 in a particular direction.

Figure 4:
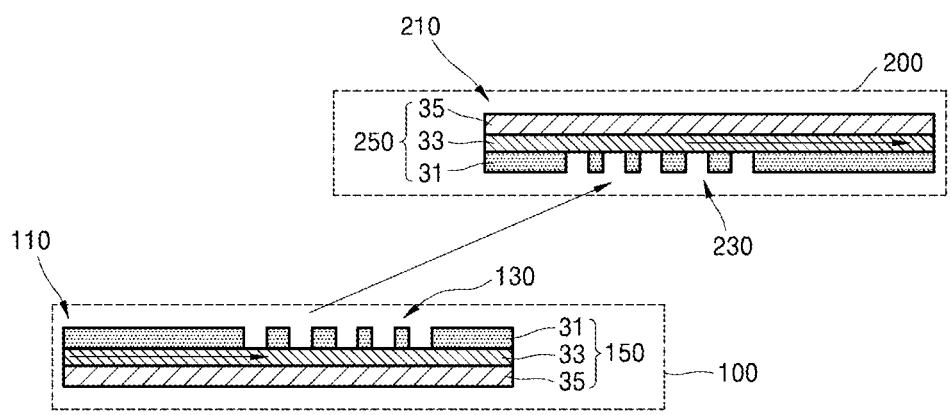
FIG. 4 illustrates a stacked integrated circuit in which the combined structure of the optical antenna and the plasmonic waveguide illustrated in FIG. 3 is used as an optical transmission unit and an optical receiving unit so that optical interconnection between layers can be performed, according to an exemplary embodiment.

FIG. 4 illustrates a stacked integrated circuit in which the combined structure of the optical antenna 10 and the plasmonic waveguide 30 illustrated in FIG. 3 is used as an optical transmission unit 110 and an optical receiving unit 210 so that optical interconnection between layers can be performed, according to an exemplary embodiment.

Referring to FIG. 4, the stacked integrated circuit according the current embodiment may include the optical transmission unit 110 including a first optical antenna 130 that outputs light, and the optical receiving unit 210 including a second optical antenna 230 that receives light transmitted from the optical transmission unit 110, so as to perform optical interconnection in which inter-layer signal transmission is performed using light. The optical transmission unit 110 is positioned in a first layer 100, and the optical receiving unit 210 is positioned in a second layer 200 different from the first layer 100 in the vertical direction and is spaced apart from the optical transmission unit 110 by a predetermined gap. Here, the first layer 100 and the second layer 200 may form a stacked structure and may be adjacent to each other, or at least one layer may further exist between the first layer 100 and the second layer 200.

The optical transmission unit 110 and the optical receiving unit 210 may be provided in such a way that layer-to-layer communication may be performed using light. Also, the optical transmission unit 110 and the optical receiving unit 210 may be disposed in different chips so that chip-to-chip communication may be performed using light. Alternatively, the optical transmission unit 110 and the optical receiving unit 210 may be disposed so that chip-to-circuit board or circuit board-to-circuit board communication may be performed using light.

To this end, the first layer 100 and the second layer 200 may be stacked on different electronic device chips and/or different photonic device chips. In this case, the electronic device chips that constitute the first layer 100 and the second layer 200 may be stacked on one circuit board or formed of different circuit boards being stacked on each other. One of the first layer 100 and the second layer 200 may be an electronic device chip, and the other one thereof may be a photonic device chip stacked on the electronic device chip. In this case, the electronic device chip and the photonic device chip may be stacked on one circuit board or on different circuit boards where are stacked on each other. Also, one of the first layer 100 and the second layer 200 may be one of the electronic device and the photonic device chip being stacked on each other, and the other one thereof may be a circuit board on which at least one of the electronic device chip and the photonic device chip is integrated. In this case, communication between a particular chip and a circuit board may be performed using light. Also, the first layer 100 and the second layer 200 may be stacked on different circuit boards. In this case, at least one of the electronic device chip and the photonic device chip may be integrated on each of the circuit boards.

Also, the first layer 100 and the second layer 200 may be elements that are stacked in the vertical direction and perform different functions within the same electronic device chip or photonic device chip.

In FIG. 4, the optical transmission unit 110 is disposed in the first layer 100, and the optical receiving unit 210 is disposed in the second layer 200. Alternatively, an optical receiving unit may be further provided in the first layer 100 so as to perform optical interconnection with other layers that are formed below the first layer 100, and an optical transmission unit may be further provided in the second layer 200 so as to perform optical interconnection with other layers that are formed above the second layer 200. In this way, pairs of an optical transmission unit and an optical receiving unit may be disposed between layers in which communication is to be performed, so as to correspond to each other.

The optical transmission unit 110 may include a first optical antenna 130 and a plasmonic waveguide 150 that includes a metal layer 31 and propagates an optical signal in the form of surface plasmon. The optical receiving unit 210 may include a second optical antenna 230 and a plasmonic waveguide 250 that includes the metal layer 31 and propagates the optical signal in the form of surface plasmon.

The optical transmission unit 110 and the optical receiving unit 210 may include a plurality of nanostructures as the first and second optical antennas 130 and 230, respectively. In this case, the plurality of nanostructures of the first optical antenna 130 and the plurality of nanostructures of the second optical antenna 230 may be upside down with respect to each other. That is, since, in an optical antenna, light can is in a direction opposite to a radiation direction, the second optical antenna 230 has to a upside down structure with respect to the first optical antenna 130 so as to receive light radiated from the first optical antenna. In this way, in the optical receiving unit 210 having the upside down structure with respect to the optical transmission unit 110, received light proceeds in the form of surface plasmon via the plasmonic waveguide 250.

The structures of the first optical antenna 130 and the plasmonic waveguide 150 of the optical transmission unit 110 and the second optical antenna 230 and the plasmonic waveguide 250 of the optical receiving unit 210 may be substantially the same as the combined structure of the optical antenna 10 and the plasmonic waveguide 30 described with reference to FIG. 3. Thus, descriptions of the structures of the first optical antenna 130 and the plasmonic waveguide 150 of the optical transmission unit 110 and the second optical antenna 230 and the plasmonic waveguide 250 of the optical receiving unit 210 will be sufficiently inferred with reference to the above description and further description will be omitted.

Figure 5:
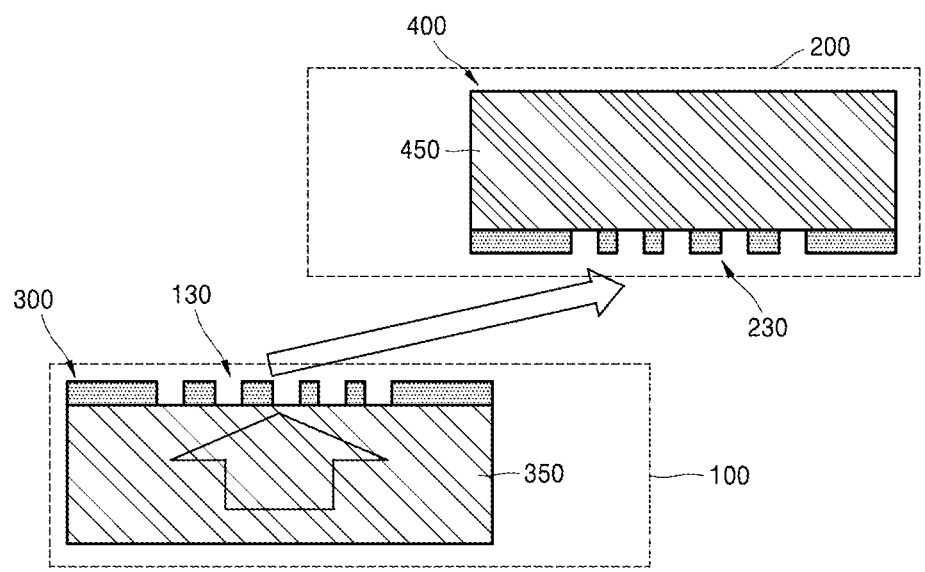
FIG. 5 schematically illustrates a stacked integrated circuit according to another exemplary embodiment.

FIG. 5 schematically illustrates a stacked integrated circuit according to another exemplary embodiment.

Referring to FIG. 5, the stacked integrated circuit according to another exemplary embodiment may include an optical transmission unit 300 including a first optical antenna 130 that outputs light and an optical receiving unit 400 including a second optical antenna 230 that receives light transmitted from the optical transmission unit 300, so as to perform optical interconnection in which inter-layer signal transmission is performed using light. The optical transmission unit 300 is positioned in a first layer 100, and the optical receiving unit 400 is positioned in a second layer 200, different from the first layer 100 in the vertical direction, and is spaced apart from the optical transmission unit 300 by a predetermined gap.

The optical transmission unit 300 and the optical receiving unit 400, respectively, may include a plurality of nanostructures as the first and second optical antennas 130 and 230. The plurality of nanostructures of the optical receiving unit 400 may be oriented upside down with respect to the nanostructures of the optical transmission unit 300.

Figure 6:
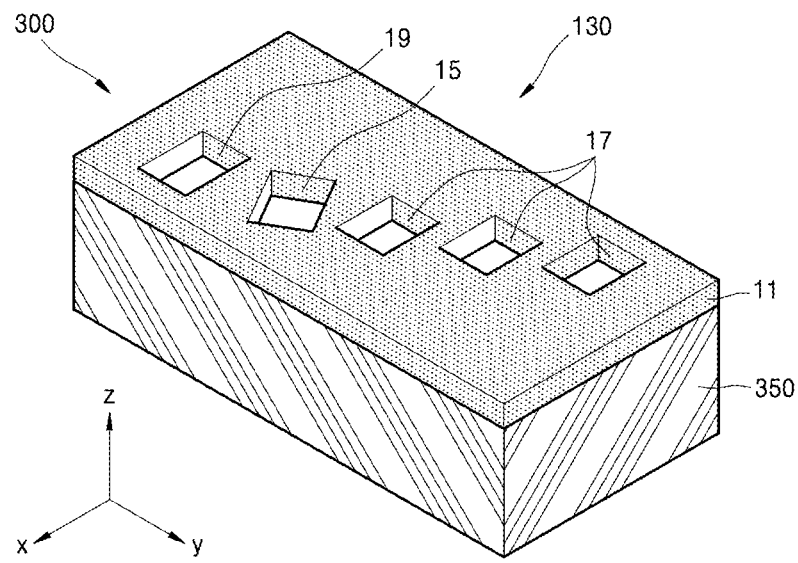
FIG. 6 illustrates an example of an optical transmission unit that may be used in the stacked integrated circuit illustrated in FIG. 5.

The optical transmission unit 300 may include a light source 350 and the first optical antenna 130 including a plurality of nanostructures 15, 17, and 19, so as to directly convert an electrical signal into an optical signal and to transmit the optical signal in one direction via the optical antenna, as illustrated in FIG. 6. The first optical antenna 130 including the plurality of nanostructures 15, 17, and 19 may be integrated with the light source 350. In this case, the light source 350 may be a laser light source.

As in the above-described embodiment, the plurality of nanostructures 15, 17, and 19 may include the first nanostructure 15, at least one second nanostructure 17, and at least one third nanostructure 19. In this case, the first nanostructure 15 may operate as a feeding unit in which surface plasmon are generated with respect to the input optical signal, the second nanostructure 17 may operate as a director that guides the direction of light, and the third nanostructure 19 may operate as a reflector that reflects light. Thus, the first nanostructure 15 may be configured in such a way that a long width of the first nanostructure 15 forms an angle of approximately 45° with respect to a polarization direction of the light generated in the light source 350. Also, the second and/or third nanostructures 17 and/or 19 may be configured in such a way that long widths and/or a long width of the second and/or third nanostructures 17 and/or 19 are parallel to the polarization direction of light generated in the light source 350.

Figure 7:
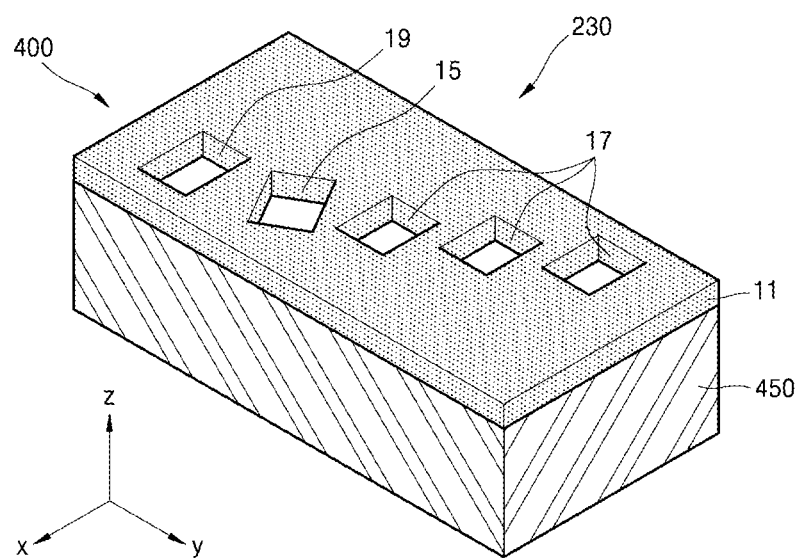
FIG. 7 illustrates an example of an optical receiving unit that may be used in the stacked integrated circuit of FIG. 5.

The optical receiving unit 400 may include an optical detector 450 and the second optical antenna 230 including a plurality of nanostructures 15, 17, and 19, as illustrated in FIG. 7. The second optical antenna 230 including the plurality of nanostructures 15, 17, and 19 may be integrated with the optical detector 450. The second optical antenna 230 receives an optical signal transmitted in a particular direction, and the optical detector 450 converts the optical signal received from the second optical antenna 230 into an electrical signal.

As described above, in a structure in which the light source 350, e.g., a laser light source and the optical detector 450 are respectively provided in the optical transmission unit 300 and the optical receiving unit 400; an optical antenna may be integrated on a laser output device which outputs polarized light, and may transmit an optical signal in a particular direction; and an optical detector may receive the optical signal from a second optical antenna, and convert the received optical signal into an electrical signal.

In an optical interconnection for a stacked integrated circuit according to the exemplary embodiments described above, signal transmission can be performed with a simple design. Thus, a wiring structure may be omitted in comparison to an existing device in which a complicated wiring structure is used for layer-to-layer or chip-to-chip communication. Since signals are transmitted at the speed of light, much faster transmission can be obtained, as compared to an existing electronic device, so that a problem of crosstalk of signals may be resolved.

Furthermore, in an optical interconnection for a stacked integrated circuit according to the exemplary embodiments described above, for optical signal transmission, light may be directly transmitted and received in a desired direction using a structure such as an optical antenna, unlike a waveguide structure that is generally used. Thus, spatial connection and geometric restriction factors of an existing waveguide structure may be eliminated so that, when such an advantage is applied to an optical integration circuit, simplification of an optical integration circuit and three-dimensional integration caused thereby can be easily performed.

As described above, according to the exemplary embodiments described herein, high-directivity beams are transmitted and received using optical antennae so as to solve a communication problem between layers in a vertical stacked structure in an optical transmission manner without an additional structure so that integrated circuits can be simplified and three-dimensional integration of the integrated circuits can be easily performed.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An optical interconnection structure comprising:
   an optical transmission unit disposed in a first layer, the optical transmission unit comprising a first optical antenna that outputs light; and
   an optical receiving unit disposed in a second layer, different from the first layer and spaced apart from the optical transmission unit by a predetermined gap, the optical receiving unit comprising a second optical antenna which receives light transmitted from the optical transmission unit,
   wherein the first optical antenna comprises a plurality of first nanostructures, each of the plurality of first nanostructures comprising a parallelepiped-shaped slot,
   wherein the second optical antenna comprises a plurality of second nanostructures, each of the plurality of second nanostructures comprising a parallelepiped-shaped slot, and wherein the plurality of second nanostructures are spaced apart from and face the plurality of first nanostructures and wherein the plurality of second nanostructures are configured to transmit or receive an optical signal.

2. The optical interconnection structure of claim 1, wherein the first layer and the second layer comprise one of:
   a layer of a first stacked electronic device chip and a layer of a second stacked electronic device chip,
   a layer of a first stacked photonic device ship and a layer of a second stacked photonic device chip, a layer of a first semiconductor package and a layer of a second semiconductor package, a layer of an electronic device chip and a layer of a photonic device chip being, and a layer of a semiconductor package, and a layer of one of an electronic device chip and a stacked photonic device chip.

3. The optical interconnection structure of claim 1, wherein the first layer is a metal layer and the second layer is a metal layer.

4. The optical interconnection structure of claim 1, wherein at least one of the first layer and the second layer comprises a plasmonic waveguide comprising a metal layer that propagates an optical signal in a form of surface plasmon.

5. The optical interconnection structure of claim 4, wherein at least cane of the plurality of first nanostructures and the plurality of second nanostructures are formed on the plasmonic waveguide.

6. The optical interconnection structure of claim 4, wherein the plasmonic waveguide further comprises a dielectric layer in contact with the metal layer.

7. The optical interconnection structure of claim 6, wherein the metal layer of the plasmonic waveguide is a first metal layer, and the plasmonic waveguide further comprises a second metal layer formed a surface of the dielectric layer opposite a surface of the dielectric layer in contact with the first metal layer, such that the plasmonic waveguide comprises a metal layer-dielectric layer-metal layer structure.

8. The optical interconnection structure of claim 1, wherein the optical transmission unit further comprises a laser light source, and the optical receiving unit further comprises an optical detector.

9. The optical interconnection structure of claim 1, wherein:

the plurality of first nanostructures feed light to the plurality of second nanostructures; and the plurality of second nanostructures direct light incident thereon.

10. The optical interconnection structure of claim 9, wherein the plurality of second nanostructures form a predetermined angle with respect to the plurality of first nanostructure.

11. The optical interconnection structure of claim 10, further comprising at least one third nanostructure which reflects light incident thereon.

12. The optical interconnection structure of claim 11, wherein the third nanostructure is parallel to the plurality of second nanostructures.

13. The optical interconnection structure of claim 9, further comprising at least one third nanostructure which reflects light incident thereon.

14. The optical interconnection structure of claim 13, wherein the at least one third nanostructure is parallel to the plurality of second nanostructures.

15. The optical interconnection structure of claim 1, wherein each of the plurality of first nanostructures and the plurality of second nanostructures has a dimension smaller than a wavelength of transmitted and received light.

16. The optical interconnection structure of claim 1, wherein the plurality of second nanostructures are upside down with respect to the plurality of first nanostructures.

17. The optical interconnection structure of claim 1, wherein the optical transmission unit is disposed in a first chip and the optical receiving unit is disposed in a second chip, different from the first chip, such that transmission of an optical signal between the optical transmission unit and the optical receiving unit comprise an optical transmission unit is a chip-to-chip communication.

18. An optical interconnection structure comprising:

an optical transmission unit comprising a first optical antenna comprising a first metal layer comprising a plurality of first nanostructures formed therein, and an optical reception unit comprising a second optical antenna comprising a second metal layer, different from the first metal layer, comprising a plurality of second nanostructures formed therein, wherein each of the plurality of first nanostructures comprises a parallelepiped-shaped slot, wherein each of the plurality of second nanostructures comprises a parallelepiped-shaped slot, and wherein the plurality of second nanostructures are spaced apart from and face the plurality of first nanostructures, such that an optical signal transmitted by the first optical antenna is received by the second optical antenna.

* * * * *